Sept. 6, 1927.

H. W. WEIMER

SHAFT SUSPENSION

Filed Jan. 31, 1925

1,641,715

Inventor
H. W. Weimer
by
Attorney

Patented Sept. 6, 1927.

1,641,715

UNITED STATES PATENT OFFICE.

HUGO W. WEIMER, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SHAFT SUSPENSION.

Application filed January 31, 1925. Serial No. 5,963.

This invention relates in general to improvements in fastenings, and relates more specifically to an improved assemblage of elements including an automatic locking device for uniting several of the elements to produce a suspension for upright shafts or the like.

An object of the invention is to provide a new and useful fastening which is simple in construction and efficient in operation.

In certain classes or types of machines, such as gyratory crushers, it is desirable to suspend an upright shaft from an end thereof so as to permit free oscillation or gyration of the shaft about a point located adjacent to the suspension device. The shafts of said machines are formed of relatively hard metal and frequently have large diameter, thus making it undesirable to cut threads or grooves therein for purposes of attachment of suspension elements. Due to the enormous pressure applied to shaft suspensions of machines such as crushers, the suspension elements must be rigidly retained in place and should be formed to tighten themselves rather than to loosen upon application of pressure.

The present invention contemplates provision of an improved suspension mechanism for shafts of machines of the above mentioned classes or types, which may be readily constructed, assembled and dismantled, and in which the rigidly united elements of the structure are automatically locked in place. The improvement eliminates necessity of threading or otherwise grooving the main shaft, and also provides a structure wherein increasing pressure properly applied serves to augment the locking effect. While the improvement is especially applicable to upright shafts of relatively large diameter, the simplicity, compactness, strength and general reliability of devices embodying the same, make its adaptability to other classes of machines, obvious. These and other objects and advantages of the invention will be apparent from the following description.

A clear conception of several embodiments of the invention and of the operation of devices constructed in accordance therewith, may be had by referring to the drawing accompanying and forming a part of this specification in which like reference characters designate the same or similar parts in the various views.

Figure 1:
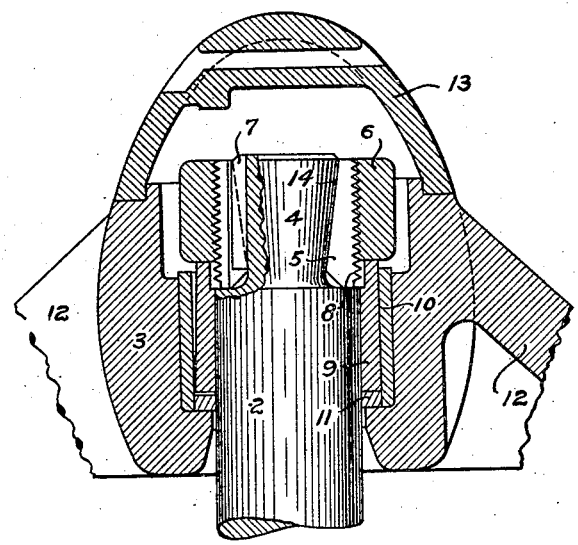
Fig. 1 is a central vertical section through an improved shaft suspension.
Figure 2:
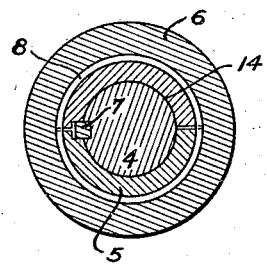
Fig. 2 is a transverse horizontal section through the shaft suspension disclosed in Fig. 1.

Referring specifically to the improved shaft suspension illustrated in Figs. 1 and 2, the main shaft 2 is provided at its upper end with an integral downwardly converging tapered portion having a frusto-conical outer surface 14 formed directly thereon. Embracing this tapered end 4 is a two-part or split member 5 having an internal frusto-conical surface coactable with the tapered surface 14 of the shaft 2 and also having its exterior provided with screw threads 8. The member 5 which may be designated as the gripping member is specifically illustrated as being formed of a pair of identical separable sections, but may be formed of one piece. The shaft end 4 and the member 5 are provided with alined grooves within which is located a key 7 for preventing relative displacement of the gripping member 5 about the shaft end 4. A one-piece ring member 6 surrounds the gripping member and is provided with screw threads coacting with the screw threads 8 of the member 5. The ring member 6 is adapted to rest upon the upper extremity of a collar 9 which embraces the shaft 2 and rests upon an annular thrust plate 11. The exterior of the collar 9 is formed slightly tapered and is adapted to coact with a sleeve 10 which is rigidly mounted within a supporting hub 3. The hub 3 is secured to the spider arms 12 and is provided at its top with a cap 13 which normally incloses the suspension mechanism.

Figure 3:
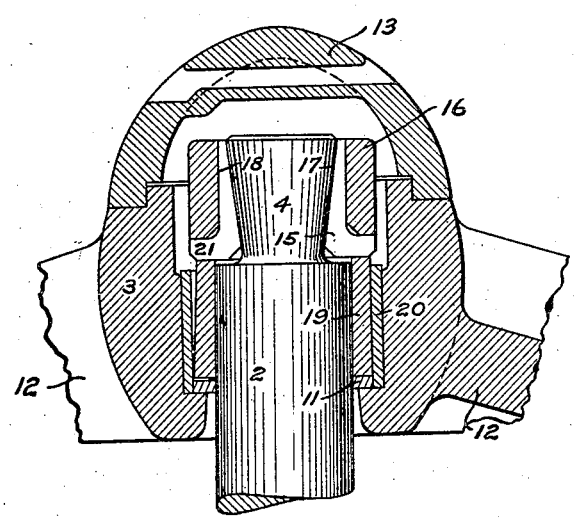
Fig. 3 is a central vertical section through another form of improved shaft suspension.
Figure 4:
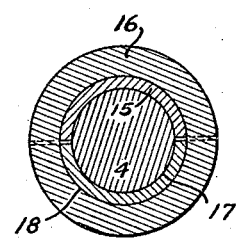
Fig. 4 is a transverse horizontal section through the shaft suspension illustrated in Fig. 3.

Referring specifically to the improved shaft suspension illustrated in Figs. 3 and 4, the main shaft 2 is provided at its upper end 4 with an integral downwardly converging tapered portion having a frusto-conical outer surface 17 formed directly thereon. Embracing this tapered end 4 is a split member 15 having an internal frusto-conical surface coacting with the shaft surface 17 and having its exterior provided with a cylindrical surface 18. The member 15 may be formed in halves and has a lower outwardly extending projection 21 which forms an annular flange surrounding the shaft 2. A one-piece ring member 16 surrounds the gripping member 15 and has a bore which coacts with the outer cylindrical surface 18 of the member 15. The ring member 16 rests upon the flange or projection 21 of the member 15, which projection in turn rests upon the upper extremity of a collar 19. The collar 19 embraces the shaft 2 and rests upon an annular thrust plate 11. The exterior of the collar 19 is formed slightly tapered and is adapted to coact with a sleeve 20 rigidly mounted within the supporting hub 3. The hub 3 is secured to the spider arms 12 and is provided at its top with a cap 13 which normally incloses the suspension mechanism.

During normal operation of either of the shaft suspensions illustrated in the drawing, the shaft 2 is being gyrated in any suitable manner and is free to rotate within the corresponding sleeve 10, 20. With the shaft in the position shown in the drawing, the collar 9, 19 has line engagements with the adjacent sleeve 10, 20 and with the thrust plate 11. As the shaft 2 gyrates the collar 9, 19 rolls along the sleeve 10, 20 and the thrust plate 11. The weight of the shaft 2 and the elements associated therewith produces a downward pressure upon the gripping member 5, 15 and causes the tapered shaft end 4 to coact with the tapered bore of the split gripping member. The ring member 6, 16 embracing the gripping member 5, 15 prevents the sections of the gripping member from spreading beyond a limited extent and causes the frusto-conical outer surface of the shaft section 4 to become wedged within the corresponding gripping member 5, 15. This wedging action is augmented by the upward reaction from the collar 9, 19 and the suspension elements are thus locked in position.

If it is desired to release the suspension members, it is simply necessary to remove the shaft 2 from its support, the shaft being provided with an upper central threaded hole adapted for insertion of an eye-bolt. With the device illustrated in Figs. 1 and 2, after the shaft 2 has been raised, the members 5, 6 may be given a blow in order to release the lock after which the ring member 6 may be unscrewed thereby releasing the sections of the gripping member 5 which are thereupon freely laterally removable. With the form of suspension disclosed in Figs. 3 and 4, the ring member 16 may be readily removed by forcing the same together with the gripping member 15, downwardly along the surface 17, after the shaft 2 has been raised, and by subsequently removing the ring member 16.

It will thus be noted that the improved suspension may be readily applied and removed and that the elements thereof are effectively locked in position during normal use. The suspension device requires no threading of the main shaft and in the form illustrated in Figs. 3 and 4, threading is completely eliminated.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a shaft having a frusto-conical external surface, a split member having a frusto-conical internal surface engaging said external shaft surface and movable relatively thereto longitudinally of said shaft, a ring member embracing said split member, and means for automatically urging said members along said shaft to lock said split member to said shaft at said surfaces.

2. In combination, an upright shaft having a frusto-conical external surface, a split member having a frusto-conical internal surface engaging said external shaft surface and movable relatively thereto longitudinally of said shaft, a ring member embracing said split member, and a thrust element supporting said members and said shaft and engaging said ring member to automatically lock said split member to said shaft along said surfaces.

3. In combination, a shaft having a frusto-conical external surface, a split member having a frusto-conical internal surface engaging said external shaft surface and movable relatively thereto longitudinally of said shaft, said split member being externally threaded, a ring member having internal threads coacting with the external threads of said split member, and means coacting with said ring member for urging said members along said shaft to lock said split member to said shaft at said surfaces.

4. In combination, an upright shaft having a frusto-conical external surface, a split member having a frusto-conical internal surface engaging said external shaft surface and movable relatively thereto longitudinally of said shaft, said split member being externally threaded, a ring member having internal threads engaging the external threads of said split member, and a thrust element supporting said members and said shaft and engaging said ring member whereby the weight of said shaft serves to automatically lock said split member to said shaft along said surfaces.

In testimony whereof, the signature of the inventor is affixed hereto.

HUGO W. WEIMER.